United States Patent [19]

Martinez

[11] 4,006,843

[45] Feb. 8, 1977

[54] APPARATUS AND METHOD OF WATERING OBJECTS

[76] Inventor: Antonio Martinez Martinez, Avda. del Manzanares No. 148, Madrid, Spain

[22] Filed: Apr. 16, 1975

[21] Appl. No.: 568,580

[30] Foreign Application Priority Data

Apr. 20, 1974 Spain .................................. 425543

[52] U.S. Cl. .................................. 222/68; 47/79; 137/244; 239/117; 239/550
[51] Int. Cl.[2] .......................................... B67D 5/08
[58] Field of Search ............. 47/48.5, 38, 38.1, 58; 58/1, 2; 137/242, 244, 262, 256, 8, 439, 219, 547, 550, 801, 43; 239/41, 43, 115, 116, 245, 266, 391, 396, 463, 256, 117, 550; 222/481.5, 181, 55, 425, 531, 537, 68

[56] References Cited

UNITED STATES PATENTS

| 799,454 | 9/1905 | Cordner ............................... 137/43 |
| 1,604,189 | 10/1926 | Nelson ................................ 47/48.5 |
| 1,710,362 | 4/1929 | Korneff ............................... 47/38.1 |
| 1,719,045 | 7/1929 | Carter ................................. 239/116 |
| 2,192,727 | 3/1940 | Courtis et al. .................. 137/256 X |
| 2,705,170 | 3/1955 | Pedigo ............................... 239/115 |
| 3,015,340 | 1/1965 | Montz et al. .................... 137/262 X |
| 3,122,157 | 2/1964 | Mukherji ........................... 137/262 |
| 3,168,224 | 2/1965 | Rios ................................. 47/38.1 X |
| 3,293,799 | 12/1966 | Keller et al. .................... 47/48.5 X |

FOREIGN PATENTS OR APPLICATIONS

| 201,922 | 7/1958 | Austria ............................... 47/48.5 |
| 841,340 | 5/1939 | France ............................... 47/38.1 |
| 974,535 | 2/1951 | France ............................... 47/48.5 |
| 116,795 | 7/1946 | Sweden ............................. 47/38.1 |
| 1,219,104 | 1/1971 | United Kingdom ............... 137/242 |

*Primary Examiner*—Edgar S. Burr
*Assistant Examiner*—James R. Feyrer
*Attorney, Agent, or Firm*—Michael J. Striker

[57] ABSTRACT

An automatic gravity-actuated plant watering system receives quantities of water from a supply, collects a predetermined amount, discharges and distributes the same whenever the collected quantities of water reach the predetermined amount. Metering means are provided to regulate the quantity of water flow per unit time, and gravity-actuated cleaning means are used to prevent contaminants from obstructing the fluid flow.

16 Claims, 2 Drawing Figures

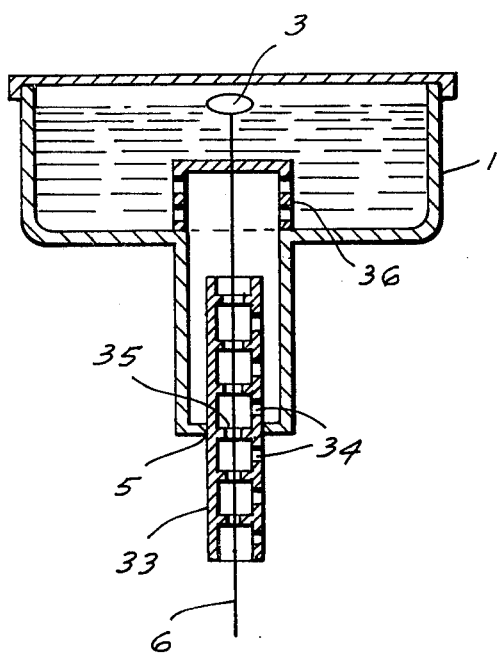
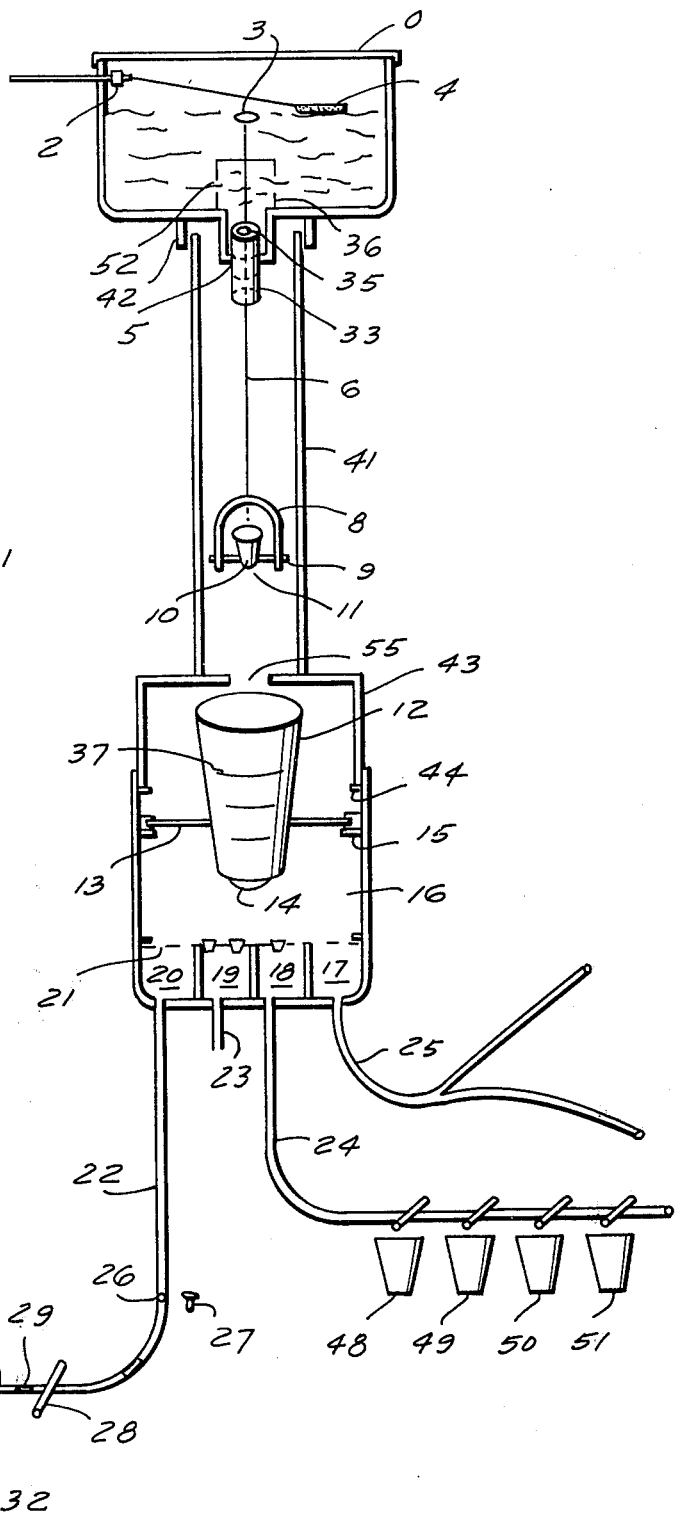
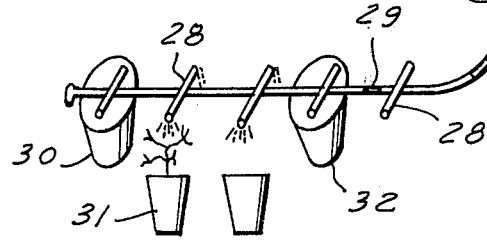

APPARATUS AND METHOD OF WATERING OBJECTS

BACKGROUND OF THE INVENTION

The present invention relates to a watering system, and more particularly to an automatic, continuously operational, gravity-actuated water system.

In addition, the present invention relates to a method of watering objects.

In the prior art, it is known to water flower pots, garden urns, ground plants, and the like by manual means requiring an operator. Whenever one decides that the time is appropriate, one obtains a quantity of water and waters the plant. It is apparent that such watering is disadvantageous, because it generally occurs at infrequent time intervals. There is no provision in the prior art for accurately metering the water flow, and the prior art watering techniques which do not require one's active participation have not been found to be satisfactory. It will be appreciated that if one is absent and cannot personally water the plants, that the plants will soon die, especially when one is absent for prolonged periods of time.

SUMMARY OF THE INVENTION

Accordingly, it is the general object of the present invention to overcome the disadvantages of the prior art.

More particularly, it is an object of the present invention to provide an improved apparatus and method of watering objects, such as plants.

Another object is to automatically water objects by gravity-actuated means.

A further object is to water objects in a controlled manner from any suitable pressurized water source.

An additional object is to meter the amounts of water flowing to the objects to be watered.

Still another object is to automatically prevent contaminants from obstructing the fluid flow by gravity-actuated means.

Still a further object is to apportion a predetermined quantity of water and distribute the same.

Still an additional object is to indicate the amounts of water being collected and inform a user when the next watering cycle will occur.

In keeping with these objects and others which will become apparent hereinafter, one feature is the receiving of quantities of water from a suitable water source or water supply and collecting said quantities of water in receiving means. The receiving means, in one preferred embodiment, is mounted on an off-center shaft so that the weight of a predetermined amount of water collected in the receiving means is operative to tilt the receiving means by shifting its center of gravity. This feature overcomes the prior art disadvantage of watering at generally infrequent intervals, since the present invention always waters the plants at a predetermined rate whenever the quantities of water reach the predetermined amount. Moreover, the gravity-actuated system does not require one's active participation.

Another feature of the present invention is to supply the water from the receiving means at a constant rate and pressure and, therefore, at a constant quantity. Control means are provided which comprises an inlet valve associated with a suitable water source which cooperates with a float floating in a reference dosing tank. Whenever the water level in the tank is reduced, the valve instantly replaces the water that has been exited. Thus, a permanently regulated and constant supply of water is supplied without having to periodically open and close a faucet or valve associated with the water source.

Another feature of the present invention is to adjustably meter the amount of water flowing from the water tank. Metering means are provided which comprises a plurality of variously sized apertures, each one of which can be moved into registry with an orifice in the water supply. Thus, by selecting one such aperture, the quantity of water issuing from the orifice is regulated.

Another feature of the present invention is to automatically clean a passage through which the water flows of contaminants by gravity-actuated means. Even despite the presence of passive protection, such as filters in the flow path, the applicant has found that when less than 10 liters of water per 24 hours (8 liters represents 0.091 cubic centimeters per second of caudal) is to be supplied that the passage becomes obstructed. Of course, such considerations depend upon the purity of the water and the size of the passage. Yet, even potable water contains dissolved minerals and contaminants so that such cleaning is necessary.

In a typical warm weather watering situation, it has been found that 15 average-sized flower pots require approximately 1½ liters of water per 24 hours. Thus, since this flow rate is considerably less than 10 liters of water per 24 hours, cleaning becomes even more imperative. Of course, the cleaning function is not necessary when the regulation of the exit orifice presents a sufficiently large caudal, but the cleaning action does not consume outside energy input and causes no detrimental effect on the operation of the system.

Another feature is the apportioning of water by the distributing means to the various plants. By collecting a predetermined amount of water and then discharging the same, all at once, the distribution can be precisely planned, rather than if the water flowed in a constant stream. The water storage compartments, each positioned at a greater elevation as compared with the objects to be watered, assure that gravity will cause a slow measured descent to each object.

Another feature is to provide elongated tubing with watering ports spaced along its length. Additional branch tubular members are slidably mounted on the tubing into registry with a desired watering port so as to simply and efficiently water the plants at any desired location.

Another feature of the present invention is to provide gradations on the receiving means so as to visually indicate the amount of water collected at any given moment. An observer can thus determine the exact moment of watering by comparing the actual level with the desired precalibrated predetermined amount. For example, if the receiving means is calibrated to discharge every 12 hours, and the collected water is only filled up to one-half the distance to the calibrated water indicator, then one will know that 6 more hours are required for automatic discharge.

This information is useful in another regard. If one wants to test the system, or accelerate or decelerate the moment of watering, one can respectively increase or decrease the collected water in the receiving means, as desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic side view, partially sectioned, of a preferred embodiment according to the present invention;

FIG. 2 is a partially sectioned, enlarged scale view of the metering means of the present invention.

DESCRIPTION OF THE PREFERRED EMBODIMENTS

Discussing the apparatus and the method illustrated in the preferred embodiment of FIGS. 1 and 2, it will be seen that reference numeral 1 identifies a cistern or reference dosing tank covered with protecting means or cap 0. The cap 0 is removable and permits access to the elements provided within the tank 1, as will be described herein.

The tank 1 has an inlet connected to a suitable water source or water supply (non-illustrated). Means for supplying the water in a path toward the objects to be watered at a constant rate or quantity and at constant pressure comprises means for controlling the water level within the reference tank 1.

A float 4 floats on the water within the tank 1 and cooperates with a valve 2 connected to the water supply. As diagrammatically shown in FIG. 1, whenever the float 4 falls below a certain level, the valve 2 is simultaneously opened to allow additional water into the tank. This cooperation assures that the average water level will remain substantially constant as a function of time, and that the average pressure of the exiting water will, in turn, remain approximately constant. In short, the rate or total quantity of water per unit time exiting the tank 1 will remain the same so that the system will be readily able to be calibrated.

Float valve 4 maintains the level of water in reference tank 1 and serves to thereby control the quantity of water available to the system, from any suitable pressurized water source, in a controlled manner.

Exiting means 5 has a passage in communication with the reference tank 1 in order to convey the water along said path. The passage has an orifice at its downstream end, as viewed along the fluid path. Means for metering or tubular element 33 regulates the water issuing from the exiting means 5. The metering means 33 is mounted on the exiting means 5 in the orifice. The metering means 33 extends lengthwise or axially of the passage and preferably has a plurality of axially-spaced apertures 35. The apertures 35 lie in mutually parallel planes and define successively variously sized regions.

In the preferred embodiment of FIG. 2, the diameters of the apertures 35 are calibrated, in successively decreasing size, as one travels from the top of the metering means 33 to the bottom thereof. The metering means 33 is movably slidably mounted in the orifice so that if one pulls down the metering means 33 so that one of the apertures 35 immediately above the aperture, which is illustrated as being registered in the orifice of FIG. 3, is now in registry with the orifice, then the water supply from the reference tank 1 is increased, and vice versa.

Of course, it will be understood that the metering means or tubular element 33 may alternatively have calibrating apertures which increase in diameter as one travels from its upper to its lower portions thereof, and that such an equivalent construction is intended to be protected as well. The metering means 33 may be made as an integral construction or be constructed of independent separate tubular pieces, each one with a calibrated aperture at its center, and subsequently assembled to form an operative unit.

Lateral holes 34 are axially spaced along the length of the metering means 33. Lateral holes 34 are preferably of greater diameter than the apertures 35 and may be used for the entrance and exit of water being supplied from the tank 1. Although not illustrated for the purposes of clarity, the entire region inside the exiting means 5, i.e., the passage therein, is filled with water which has been filtered through the filtering means 36.

In other words, the quantity of water supplied is easily measured and calibrated and will depend upon the diameter of the aperture 35 which has been registered in the orifice, the lateral holes 34, and the water pressure.

In order to visually indicate the exact quantity to an observer, one can either note which lateral hole 34 is situated next to the orifice or, preferably, use the indicating means which serves as a visual measuring device. The indicating means (now shown) is provided with time and quantity markings. The indicator means (not shown) cooperates with the cleaning means, to be described herein, and is adapted to move vertically depending upon the weight of the water collected in the collector 9.

As an example of the utility of the indicator means (not shown), one may measure over a short measured period of time, e.g. 5 minutes, that the water has reached one-tenth of the desired predetermined amount. This, for example, may correspond to a fluid flow rate indicating that 3 liters of water will be supplied in a 24 hour time period. Now, one can deduce that if the water did not reach one-tenth of the desired amount, but instead completely reached the predetermined amount, that the flow rate would be supplied at 30 liters in a 24 hours time period.

Cleaning means for cleaning the passage and the orifice of the exiting means 5 comprises a cleaning element or wire 6 being suitably dimensioned so that it extends through all of the apertures 35 of the metering means 33. The cleaning element 6 moves freely therethrough without being obstructed even by the smallest sized aperture 35.

Connected at one end of the cleaning wire 6, a yieldable support 3 is mounted within the tank 1. A collector 10 is connected to the other end of the cleaning wire 6 and is supported on an off-center shaft 9 which is, in turn, journalled on the support arch 8.

The collector 10 is positioned underneath the exiting means 5 to receive the water issuing from the passage and counters and opposes the yieldable support 3. The yieldable support 3 may be a spring or a float, the latter being illustrated in the drawing. As more and more water is collected in the collector 10, the weight at this end of the cleaning wire 6 causes the support 3 to yield and descend vertically in the direction of the water flow through said passage. Upon the descent of the wire 6, a predetermined amount of water will cause the collector 10, which is initially in an upright position so as to receive the water, to tilt about the off-center shaft 9 due to the fact that the center of gravity of the collector 10 has been shifted. These tilting and descending movements cause the cleaning element 6 to move both vertically and radially within the passage so as to clean the exit orifice of any impurities that have accumulated therein.

After tilting has occurred, restoring means or counterweight 11 returns the collector 10 back to its original upright position. The tilting of the collector 10 empties the water contained therein which is, in turn, accumulated by the container or means for receiving 12. The container 12 has indicating means or gradations 37 thereon to indicate when a predetermined amount of water has been accumulated.

Means for discharging this predetermined amount includes an off-center shaft 15 which does not pass through the center of gravity of the container 12, in a manner quite analogous to the shaft 9 previously discussed. The shaft 15 is mounted in a receptacle 16 which is positioned to receive said predetermined amount subsequent to operation of the discharging means.

When the predetermined amount of water has been obtained in the container 12, the container 12 tilts over from its original upright position due to the shift in its center of gravity caused by the added weight of the water eventually countering the counterweight 14. After the tilting has been completed, the container 12 is emptied and returned to its upright position due to the restoring force exerted by the counterweight 14. It will be understood that the weight of the counterweight 14 may be varied so that the total quantity of water actually stored in the container 12 may be adjusted as desired.

The means for distributing the predetermined quantity of water in the receptacle 16 includes apportioning means or compartments 17 through 20. Each compartment 17 through 20 has at least one inlet or opening 21, and preferably a plurality of such inlets for each compartment. The amount of water apportioned to each compartment depends upon the number of adjusting means or plugs mounted in respective ones of said inlets.

For example, as shown in FIG. 1, compartments 17 and 20 are completely opened; compartment 19 is completely closed; and compartment 18 is partially opened. In this manner, the amount of water issued from the respective outlets of the compartments to the objects to be watered may be apportioned. A single compartment may therefore receive all, one-half, one-third, or one-fourth, and so on, depending upon how many of the neighboring compartments are sealed off.

Conveying means or elongated tubes 22 through 25 connected to the outlets of the compartments 17 through 20 convey the predetermined amount directly to the objects to be watered. The tubes have watering ports or openings 26, 29 spaced along the elongation of the tubes. Adjustment means or plug members 27 are inserted into these watering ports when water flow is to be prevented from flowing therefrom (as at opening 26).

Where water flow is not to be prevented, branch tubular elements or rubber hoses 28 extending in a direction transversely to the elongation of the tubes 22 through 25 are slidably mounted thereon. The branch elements 28 are used to direct the water toward the object and spray it. The branch elements are hollow and are positioned to be in communication with the axially spaced watering ports 29. Each of the tubes may be closed-ended or open-ended and define a linear flow path away from their respective compartments. Alternatively, the ends of a tube may be connected to two separate compartments and thereby equalize the pressure within said tube.

The different orientation, illustrated in FIG. 2, of the objects 30, 31 and 32 are intended to show the versatility of the watering system. The other tubes 23, 24 and 25 are utilized for watering other rows of objects and may each be located at different heights depending upon the practical application.

It has been found that spacing the openings or watering ports 29 every 7 centimeters is particularly advantageous for most applications.

Additional filtering means may be placed in the inlets and/or outlets of the compartments to aid in filtering out contaminants which have passed through the filter 36.

An alarm system may be included in the watering system in order to advise one that the watering operation is about to begin, i.e., that the container 12 is about to be discharged and emptied. A stop means (non-illustrated) is positioned in the path of the tilting container 12 so as to be struck by the latter. This engagement makes a noise, or alternatively, the contact may complete an electrical circuit, which signals that the predetermined amount has been obtained.

In order to substantially stop the watering, the metering means 33 is retracted all the way within the passage of the exiting means 5 so that the smallest-sized aperture 35 registers with the orifice. Although the cleaning wire 6 is still permitted to move within this aperture, little room is left for the water to come out of the smallest sized aperture. Of course, the lateral hole 34 adjacent the smallest-size aperture 35 is fully retracted and cannot permit the exiting of any water therethrough. As an alternative measure, valve 2 can be closed and stop all flow of water along the path.

Container 12 is preferably supported so that it partially projects outwardly of the receptacle 16. This feature assures that the level of water is easily read by the gradations 37. Now, one will know when the discharging of the water will take place, and this information can be used to cause watering at any time by adding or removing water from the container 12 as desired.

The elements of FIGS. 1 and 2 are positioned directly above the elements illustrated in FIG. 2 so that the described operation can occur without spillage. A cover (non-illustrated) or protecting means surrounds and protects these elements from the rays of the sun, other environmental hazards and foreign objects. The receptacle 16 is protected by a cap 43 which is provided with a hole 55 so as to permit the passage of water into container 12 coming from the collector 10.

The objects to be watered may be household flower pots containing plants, greenhouse plants, or any similar ground plants requiring irrigation.

From the above-mentioned description of the operation of this system, it will be seen that no energy other than the force of gravity is utilized.

It will be understood that each of the elements described above, or two or more together, may also find a useful application in other types of constructions differing from the types described above.

While the invention has been illustrated and described as embodied in an apparatus and method of watering objects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of watering objects, comprising the steps of receiving water in a tank having a passage formed with an orifice through which the water may flow; metering quantities of the flowing water per unit time by moving an elongated tubular element having a plurality of differently-sized first holes spaced longitudinally along said element and lying in substantially parallel transverse planes with respect to each other, and a plurality of second holes spaced longitudinally along said element and alternatingly between said first holes and operative for communicating each of said first holes with the exterior of said element, said step of moving said element including registering a selected one of said first holes with said orifice so as to selectively vary the amounts of water flowing through said first holes to be expelled from said element; collecting said metered quantities of expelled water; automatically discharging the collected quantities of water whenever they reach a predetermined amount; and conducting the discharged amount of water towards the objects to be watered.

2. A watering system, comprising a reference tank for receiving water and having a passage formed with an orifice through which the water may flow; means for metering the flow of water issuing from said tank, including an elongated tubular element having a plurality of differently sized first apertures spaced longitudinally along said element and lying in substantially parallel transverse planes with respect to each other, and a plurality of second apertures spaced longitudinally along said element and alternating between said first apertures and also communicating each of said first apertures with the exterior of said element, said element being movably mounted in said passage so that a selected one of said first apertures is moved into registry with said orifice for selectively varying the amount of water which flows through said first apertures to be expelled from said metering means; means for receiving quantities of the water expelled from said metering means; means for distributing a predetermined amount of said received quantities to objects to be watered; and means for discharging said predetermined amount to said distributing means whenever said received quantities reach said predetermined amount.

3. A watering system as defined in claim 2; and further comprising means for supplying the water from said tank to said receiving means at constant rate and pressure, and means for controlling the level of water in said reference tank so that said water exits with constant pressure and quantity per unit time.

4. A watering system as defined in claim 3, wherein said controlling means includes a float floating on said water in said tank and a valve associated with a water source, said float and said valve cooperating to replace water that has been exited from said tank.

5. A watering system as defined in claim 2, wherein said receiving means is a container, and wherein said discharging means comprises a shaft for eccentrically mounting said container, said container normally assuming an initial upright position so as to face said water and receive a predetermined amount thereof, the weight thereof being operative to tilt said container by shifting its center of gravity; and further comprising means for restoring said container into said initial position after said predetermined amount has been obtained.

6. A watering system as defined in claim 2, wherein said means for distributing comprises a receptacle positioned to receive said predetermined amount subsequent to operation of said discharging means, and means for apportioning said predetermined amount.

7. A watering system as defined in claim 6, wherein said apportioning means comprises a plurality of compartments, each having inlets in communication with said receptacle and outlets; and further comprising means for conveying said predetermined amount to the objects to be watered.

8. A watering system as defined in claim 7, wherein said conveying means comprises elongated tubes having watering ports spaced along the length of said tubes, and wherein said compartments are located at a higher elevation than said watering ports so that gravity will cause the water to descend.

9. A watering system as defined in claim 7; and further comprising plug members on some of said inlets and some of said outlets so as to direct the fluid flow along a desired path.

10. A watering system as defined in claim 2; and further comprising means for protecting said system from the exterior environment.

11. A watering system as defined in claim 2, wherein said watering system is gravity-actuated.

12. A watering system as defined in claim 2; and further comprising means for cleaning said apertures including a cleaning wire extending through said passage and said first apertures, and means for supporting and moving said cleaning wire within said passage to clean said first apertures.

13. A watering system as defined in claim 12, wherein said cleaning means further comprises a yieldable support mounted within said tank connected to one end of said cleaning wire, and a collector positioned to receive said water issuing from said passage, the weight of said water countering said yieldable support and causing the latter and said cleaning wire to descend vertically in said passage.

14. A watering system as defined in claim 13, wherein said cleaning means further comprises an off-center shaft initially supporting said collector in an upright position and operative to tilt the latter when the weight of a precalculated quantity of water therein shifts the center of gravity of said collector, the tilting causing the cleaning wire to move radially in said passage.

15. A watering system as defined in claim 2; and further comprising means for indicating the amount of water being received by said receiving means, said indicating means constituting visible marking lines on a side of said receiving means for indicating the level of water received therein.

16. A watering system as defined in claim 1; and further comprising means for filtering the water so as to bar foreign objects from reaching the objects to be watered, said filtering means comprising a screen overlying said passage through which the water from said tank passes and being formed with a plurality of holes.

* * * * *